United States Patent [19]

McDilda et al.

[11] Patent Number: 5,292,846
[45] Date of Patent: Mar. 8, 1994

[54] METHOD OF MANUFACTURING REFRIGERATED DOUGH

[75] Inventors: Joseph C. McDilda; Cheryl L. Mitchell, both of Brooklyn Park; Barbara L. Francken, Richfield, all of Minn.

[73] Assignee: The Pillsbury Company, Minneapolis, Minn.

[21] Appl. No.: 876,925

[22] Filed: May 1, 1992

[51] Int. Cl.$^5$ ............................ A21D 6/00; A21D 8/02
[52] U.S. Cl. ...................................... 426/549; 426/19; 426/524; 426/556
[58] Field of Search ................. 426/549, 19, 556, 524

[56] References Cited

U.S. PATENT DOCUMENTS

| | | | |
|---|---|---|---|
| 3,177,081 | 4/1965 | Kleinschmidt | 99/172 |
| 3,524,401 | 8/1970 | Hosfield | 99/90 |
| 3,593,676 | 7/1971 | Reid | 107/12 |
| 3,879,563 | 4/1975 | Tucker et al. | 426/128 |
| 4,842,882 | 6/1989 | Paulucci | 426/94 |
| 5,182,124 | 1/1993 | Kageyama et al. | 426/19 |

OTHER PUBLICATIONS

"Nutritive Sweeteners From Corn," Corn Refiners Assoc'n, Inc., 1989, p. 23.

*Primary Examiner*—Jeanette Hunter
*Assistant Examiner*—Mary S. Mims
*Attorney, Agent, or Firm*—Amy Hoffman; Aleya Rahman

[57] ABSTRACT

A method of manufacturing refrigerated sweet dough at or below 70 degrees Fahrenheit or thereabout without cooling the flour below about 75° F. is disclosed which comprises combining flour, water, ice, and fat to form a dough; mixing said dough to develop the gluten; adding sugar and leavener to said developed dough wherein said sugar is chosen to maintain the temperature of said dough at or below 70 degrees Fahrenheit or thereabout; and mixing said dough with said sugar and said leavener to evenly distribute said sugar and said leavener throughout said dough.

10 Claims, 1 Drawing Sheet

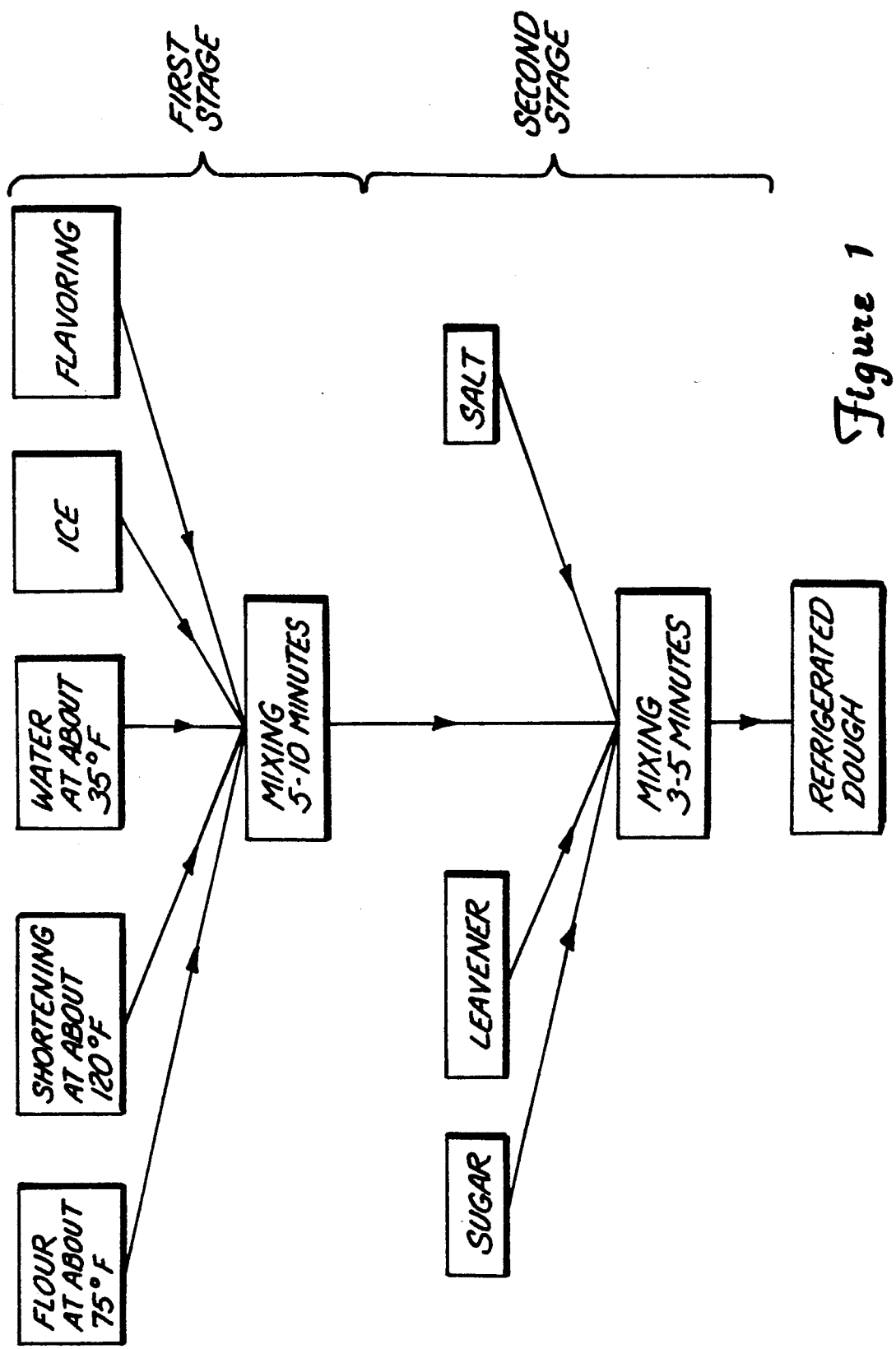

METHOD OF MANUFACTURING REFRIGERATED DOUGH

FIELD OF THE INVENTION

The invention relates to the manufacture of sweet refrigerated dough. Specifically, the invention provides a method of manufacturing refrigerated dough which controls the temperature of dough during processing. The invention teaches a method of choosing and adding ingredients to form a dough which maintains the temperature of the dough at or below 70 degrees Fahrenheit or thereabout without using expensive cooling equipment. The method involves two critical steps. First, some moisture is added to the dough in the form of ice. Second, the type and amount of sugar added to the dough is carefully chosen such that the dissolution of the sugar in the dough does not adversely affect dough temperature.

BACKGROUND OF THE INVENTION

Refrigerated doughs are increasingly popular with consumers due to ease of preparation. Since the dough is fully prepared, the consumer is left only with the task of baking the dough in order to attain "fresh from the oven" rolls, biscuits, bread and pastries.

Although refrigerated doughs are a great boon to consumers, processing the doughs pose large problems for manufacturers. Processing of refrigerated doughs is unique. Unlike dough processing in bakeries, refrigerated doughs require significantly more processing in the form of sheeting, lapping, and packaging of the dough. Processing lines for refrigerated doughs can extend over one hundred feet. An example of a typical processing/sheeting line for refrigerated dough is outlined in U.S. Pat. Nos. 3,593,676 and 3,177,081 which are herein incorporated by reference.

One of the major problems encountered during manufacture of refrigerated dough is that dough temperature may increase to a point where processing is impossible or dough quality decreases. The temperature of refrigerated dough must remain at or below 70 degrees Fahrenheit or thereabout throughout processing to ensure that the leaveners are not spent during processing. The temperature of the dough must remain low to limit the dough from sticking to the rollers during sheeting and to generally ease handling of the dough. Finally, the temperature of the dough must remain low to ensure consistent packing of the dough into cans.

The Pillsbury Company is currently selling refrigerated dough for sweet rolls which contain up to about 7–8% dextrose by weight. An example of a typical refrigerated dough formulation is the following:

| Ingredients | Percent by weight |
|---|---|
| Flour | 45–55 |
| Shortening | 2–6 |
| Water | 20–29 |
| Dextrose | 2–8 |
| Salt | 0.1–2 |
| Leavener | 1–4 |
| Flavoring | 0–9 |

U.S. Pat. No. 3,524,401 describes refrigerated dough mixing and preparation and is herein incorporated by reference. Any type of leavener system suitable for refrigerated doughs may be employed in the composition, these include but are not limited to chemical leaveners. Doughs prepared according to the above formulation remain at or below 70° F. or thereabout without the use of cooling equipment.

Due to the consumers' increasing desire for sweeter foods, dough manufacturers have reformulated their sweet refrigerated doughs such as rolls, pastries, and strudels to yield sweeter products. Consumer preference correlates directly with product sweetness. Consumers prefer a sweeter product than products prepared from doughs according to the typical formulation above. This has sparked an interest to reformulate the dough. Although altering the dough to create a sweeter product may seem relatively simple, unforeseen problems arise during reformulation. Specifically, merely changing the ingredients of the dough unexpectedly raised the temperature of the dough leaving the new formulation unsuitable for processing.

Reformulating doughs to sweeten the end product is achieved by two methods. The amount of sugar present in the dough is increased, and/or a sweeter sugar is substituted for the sugar already present in the dough.

Sugars are ranked according to the sweet taste they impart. To rank sugars, a 10% aqueous solution of the sugar is tasted at room temperature. Sucrose is the reference sugar and is arbitrarily given a value of 100. All other sugars are compared to the sweetness of sucrose and ranked accordingly. Fructose and dextrose are sugars commonly used to sweeten foodstuffs. On the sucrose reference scale, fructose has a sweetness value of 117, and dextrose has a value of 65.

Trials with taste testers determined that a dough containing about 16% sucrose had the desired sweetness for sweet rolls. This dough was significantly sweeter than a similar product prepared with 8% dextrose.

Problems arose when production of the 16% sucrose dough was scaled up for commercial manufacture. In order to add more sugar to the dough, the major components of the dough formulation had to be altered. Specifically, the flour and water composition of the dough also had to be altered along with altering the sugar composition. This was necessary to maintain a constant batch size and also to attempt to achieve the desired rheology of the dough. Thus, by changing the sugar composition, the flour to water ratio in the dough was also changed yielding a dough higher in percent solids. The higher percentage of solids inhibited gluten development and dough formation since less water was present to wet the flour. It was therefore impossible to make a dough containing 16% sucrose because altering the dough formulation to increase the amount of sugar above 12% deleteriously affected gluten development and therefore affected dough rheology.

Generally, dough development describes the phenomenon by which a loose mass of flour particles, when admixed with water, becomes a cohesive resilient body of dough. As the dough is mixed, the gluten protein from the flour forms a resilient, extensible matrix. This matrix is necessary for dough formation. It allows the dough to entrap and retain leavening gas bubbles and is the initial support for the expanding dough structure during baking.

Adding a greater percentage of sugar to the dough obviously changed the flour to water ratio yielding a dough higher in percent solids. The higher percentage of solids inhibited dough formation since less water was present to wet the flour and form a dough.

When it became apparent that a dough containing 16% sucrose was impossible to produce, a dough containing 12% sucrose was tested. It was surprisingly found that even increasing the sucrose to 12% was impossible because an increase to 12% sucrose in the dough unexpectedly raised the dough temperature above 70 degrees Fahrenheit or thereabout. This change in temperature made the dough unsuitable for processing. Therefore, it was impossible to manufacture a refrigerated dough containing even 12% sucrose under current manufacturing practices.

The problem of increased temperature created by changing the sugar composition of the dough can be solved by installing cooling equipment. This equipment may either lower the temperature of the ingredients which are added to the dough or may act to cool the dough once it has been formed. Although adding cooling equipment will solve the problem of creating a sweeter dough and maintaining a low processing temperature, it is prohibitively expensive. For example, equipment to cool ingredients used to prepare refrigerated dough in a facility which produces up to 3 million cases per year would cost around $1 million. The cost of operating such equipment would raise the cost of the dough up to 4%.

Next, a dough composition containing 12% dextrose was tested. Although this did produce a dough with a temperature suitable for refrigerated dough production, a dough containing 12% dextrose did not yield a dough sweet enough for consumer's tastes. It was impossible to produce a dough having the optimum level of sweetness without employing additional cooling equipment before the advent of the present invention.

DESCRIPTION OF THE DRAWINGS

FIG. 1 is a flow chart showing mixing of refrigerated dough.

SUMMARY OF THE INVENTION

The present invention provides a method of manufacturing sweet refrigerated dough while maintaining the dough temperature at or below 70 degrees Fahrenheit or thereabout without employing costly cooling equipment to cool the flour below about 75° F. The method involves altering the composition of the dough to control temperature while still maintaining the sweetness level preferred by consumers. The form in which water is added and the amount and type of sugar placed in the dough are adjusted to ensure the temperature of the dough remains at or below 70 degrees Fahrenheit or thereabout during processing.

DETAILED DESCRIPTION OF THE INVENTION

The invention relates to sweet refrigerated doughs. Before the advent of this invention it was impossible to produce a highly sweet refrigerated dough without cooling the flour below about 75° F. Altering the sugar composition to sweeten the dough unexpectedly altered the temperature of the refrigerated dough making it unsuitable for processing.

For the purpose of this disclosure, a sweet dough is defined as a dough containing 8% or more sugar by weight.

Dough is traditionally mixed in two stages. U.S. Pat. No. 3,879,563 which is herein incorporated by reference describes a typical mixing procedure for refrigerated doughs. As the dough is mixed, energy is added to the dough system causing the dough to heat. Therefore, it is critical to maintain a low dough temperature during both stages of ingredient addition to ensure the dough remains cool for handling. The invention accomplishes this by altering some of the ingredients added during each stage. The adjustments in the ingredients effectively cool the dough during mixing.

As described above, refrigerated doughs are commonly prepared in two stages. The two stage mixing procedure as shown in FIG. 1 is briefly outlined as follows. First the flour, shortening, water, ice and flavorings are combined. These are the first stage ingredients and the temperatures of the ingredients are important except for the temperature of the flavorings. Flour is added at about 75° F., molten shortening which is at about 120° F. is added, and water is at about 35° F. when it is added during the first stage. The amount of flavorings by weight is such a small amount relative to the overall weight of the total first stage ingredients that the ingoing temperature of the flavorings does not impact the temperature of the first stage ingredients and is therefore not critical. These ingredients, together with the ice, are mixed approximately 5 to 10 minutes to develop the gluten of the dough.

Second stage ingredients such as sugar, salt, and leavener are then added to the developed dough and mixed for about 3 to 5 minutes until they are evenly distributed throughout the dough. Since the amount by weight of the second stage ingredients is small relative to the total dough weight, the temperatures of the ingredients added during second stage ingredient addition are not critical.

In the preferred embodiment up to about ⅓ of the water added during the first stage is added as ice. The entire amount of water cannot be added as ice because enough liquid water must be added to the composition to properly wet the flour and allow a dough to develop. If greater than about ⅓ of the total weight of the water is added as ice, the gluten cannot develop and a dough will not consistently form. Adding ice during the first stage helps to counteract the heat generated by mixing and forming the dough.

The temperature of the dough must also be controlled during the second stage of ingredient addition. The invention provides a method of maintaining the dough at or below 70 degrees Fahrenheit or thereabout without employing expensive cooling equipment. The method employs the step of altering the type and amount of sugar used to formulate the dough.

By practicing the invention it is not necessary to further cool the first stage ingredients. Specifically, flour does not need to be cooled below about 75° F. if the invention is practiced. It would be very expensive to cool flour below about 75° F. since water condenses out of the air surrounding the flour below about 75° F. This means that if flour is cooled below about 75° F., water will begin to condense around or about the cooling equipment and may collect in conveying areas, storage bins and weigh hoppers. If water collects in a flour storage or handling area health concerns arise because mold and bacteria proliferate in the moist environment. Therefore, in order to cool flour below about 75° F., the environment in which the flour is stored must be conditioned to remove any condensate. Equipment to accomplish this is extremely expensive to purchase and to operate.

Dissolving sugar is an endothermic reaction. The amount of energy required to place a sugar into solution varies depending upon the chemical structure of the sugar. The energy required to dissolve a given amount of crystalline sugar is commonly referred to as the Heat of Solution. Several sugars are listed below along with their corresponding Heat of Solution:

| Sugar | Heat of Solution |
| --- | --- |
| Dextrose | −45.4 BTU/pound |
| Sucrose | −6.9 BTU/pound |
| Fructose | −21.6 BTU/pound |

Since dextrose consumes the most energy when going into solution (45.4 BTU/pound), adding dextrose to a system would have the greatest cooling effect on the system as compared to adding fructose or sucrose. Following dextrose, fructose consumes the next most energy during dissolution. However, fructose is difficult to use in the crystalline state due to its hygroscopic nature. Fructose is commonly used as a syrup in High Fructose Corn Syrup which does not have the above-listed Heat of Solution. Finally, sucrose, a moderately sweet sugar, consumes the least amount of energy during dissolution.

Although dextrose cools a dough to the greatest degree, it is also the least sweet of the listed sugars. The amount of crystalline sugar which can be added to a dough without deleteriously affecting dough rheology and inhibiting gluten formation is about 12%. Therefore, although adding dextrose would sufficiently maintain the dough at a cool temperature, enough dextrose cannot be added to a dough to produce a sweet enough dough for the consumer's liking.

One may predict how much the temperature of a given dough will change when the sugar composition of the dough is changed. The amount of cooling or lack thereof which a given sugar will have on a system can be predicted by using the Heat of Solution for that sugar. Theoretical calculations are done using the heat capacity and the heat of solution of major dough components. The Heat capacity of a substance is the energy needed to heat that substance one degree.

Flour and water are the major components of refrigerated doughs, therefore, they are the components which must be considered when determining the temperature effect of a given sugar on the dough composition. The heat capacity of flour and water are given below:
 Heat Capacity of Flour=0.44 BTU/(pound)(°F.)
 Heat Capacity of Water=1 BTU/(pound)(°F.)

Following a typical dough formulation having 8% by weight total sugar content, a dough would contain about 1000 lbs flour, 500 lbs water, and 150 lbs sugar. The energy required to change the temperature of 1000 lbs flour is: 0.44 BTU/ (lb) (°F.)×1000 lb flour=440 BTU/°F. The energy required to change the temperature of 500 lbs water is: 1 BTU/(lb) (°F.)×500 lb water=500 BTU/°F. The energy required to change the temperature of the combined flour and water is 500 BTU/°F. (water)+440 BTU/°F. (flour)=940 BTU/°F.

Using the Heat of Solution of a given sugar, one can calculate how much energy will be consumed to dissolve a given amount of a given sugar. For dextrose and sucrose, the amount of energy required to get 150 lbs of sugar into solution is as follows:
 Dextrose: −45.4 BTU/lb×150 lb= −6810 BTU,
 Sucrose: −6.9 BTU/lb×150 lb= −1035 BTU.
Fructose is not considered for these calculations since crystalline is fructose is difficult to work with in the manufacturing process as mentioned above. Adding sugar to the flour and water combination will approximately decrease the temperature of the composition by the following amount:
 Dextrose: −6810 BTU×1/940 BTU/°F. = −7.2° F.
 Sucrose: −1035 BTU×1/940 BTU/°F. = −1.1° F.
Thus, the difference in batch temperature between using dextrose as compared to using sucrose is 6.1° F. assuming all else is constant between the two compositions.

The theoretical calculations have been correct within 1-2° F. when actually tested at commercial batch levels. Thus, the method described may be used to predict and select the type and amount of sugar used for a given refrigerated dough in order to maintain the temperature below 70° F. or thereabout.

Knowing the temperature of the dough before changing the sugar formulation, one can predict the temperature of the dough after changing the sugar composition. In the preferred embodiment, about 8% sucrose by weight and about 4% dextrose by weight (for optimizing sweetness and dough temperature) are added during the second stage of refrigerated dough formation. The preferred formulation of a sweet refrigerated dough is given.

| Ingredient | % by weight |
| --- | --- |
| Flour | 45-50 |
| Water | 13-18 |
| Ice | 6-9 |
| Shortening | 2-6 |
| Flavorings | 0-4 |
| Leavener | 0.1-4 |
| Salt | 0.1-3 |
| Sucrose | 6-10 |
| Dextrose | 2-6 |

Such a dough composition yields a sufficiently sweet product while still maintaining the temperature during processing at or below 70 degrees Fahrenheit or thereabout without cooling the flour below about 75° F.

While not intending to be bound by the dough formulations given in this disclosure, it will be apparent that any dough composition suitable for extended refrigerated storage may be manufactured and temperature-controlled by the above-described method.

We claim:

1. A method of manufacturing refrigerated sweet dough at or below 70 degrees Fahrenheit or thereabout without cooling flour below about 75° F., comprising:
 a) combining and mixing flour, water, ice, and fat to form a dough;
 b) mixing said dough to develop the gluten;
 c) adding sugar and leavener to said developed dough wherein said sugar is chosen to maintain the temperature of said dough at or below 70 degrees Fahrenheit or thereabout; and
 d) mixing said dough with said sugar and said leavener to evenly distribute said sugar and said leavener throughout said dough.

2. The method of manufacturing refrigerated sweet dough of claim 1 wherein up to about ⅓ of the total water content of the dough is added as ice.

3. The method of manufacturing refrigerated sweet dough of claim 1 wherein said sugar is a combination of sugars.

4. The method of manufacturing refrigerated sweet dough of claim 1 wherein said sugar is selected from the group comprising dextrose, sucrose, and fructose.

5. The method of manufacturing refrigerated sweet dough of claim 1 wherein said sugar is comprised of about 8% sucrose and about 4% dextrose.

6. The method of manufacturing refrigerated sweet dough of claim 1 wherein said leavener is a chemical leavener.

7. A refrigerated sweet dough as prepared by the method of claim 1.

8. A method of manufacturing refrigerated dough at or below 70 degrees Fahrenheit or thereabout without cooling flour below about 75 degrees Fahrenheit, comprising:
   a) combining the first stage ingredients to form a dough, said first stage ingredients, comprising:
      i) 45-50% flour by weight;
      ii) 13-18% water by weight;
      iii) 6-9% ice by weight; and
      iv) 2-6% shortening by weight;
   b) mixing said dough to develop the gluten;
   c) adding second stage ingredients to said developed dough, said second stage ingredients comprising:
      i) up to about 12% sugar by weight whereby said sugar is chosen to maintain the temperature of the dough at or below 70 degrees Fahrenheit or thereabout; and
      ii) up to about 4% leavener by weight; and
   d) mixing said developed dough with said second stage ingredients to evenly distribute said second stage ingredients throughout said developed dough.

9. The method of manufacturing refrigerated sweet dough of claim 8 wherein said sugar is comprised of about 8% sucrose and about 4% dextrose.

10. A refrigerated sweet dough as prepared by the method of claim 8.

* * * * *